US012108309B2

United States Patent
Pothiboon et al.

(10) Patent No.: US 12,108,309 B2
(45) Date of Patent: Oct. 1, 2024

(54) WIRELESS COMMUNICATIONS SYSTEM AND METHOD

(71) Applicant: VTech Telecommunications Limited, Hong Kong (CN)

(72) Inventors: Supajet Guy Pothiboon, Richmond (CA); Bennett Cheng, Vancouver (CA); Gary Louie, Vancouver (CA); Ralph Tischler, Richmond (CA); Chung Shing Lam, Hong Kong (CN)

(73) Assignee: VTECH TELECOMMUNICATIONS LIMITED, Hong Kong (CN)

( * ) Notice: Subject to any disclaimer, the term of this patent is extended or adjusted under 35 U.S.C. 154(b) by 259 days.

(21) Appl. No.: 17/546,040

(22) Filed: Dec. 8, 2021

(65) Prior Publication Data
US 2023/0179957 A1  Jun. 8, 2023

(51) Int. Cl.
*H04W 4/06* (2009.01)

(52) U.S. Cl.
CPC ..................... *H04W 4/06* (2013.01)

(58) Field of Classification Search
CPC .... H04W 4/06; H04M 1/725; H04M 1/72505
See application file for complete search history.

(56) References Cited

U.S. PATENT DOCUMENTS

| | | | | |
|---|---|---|---|---|
| 4,259,549 A * | 3/1981 | Stehman | ................. | G06F 15/16 379/267 |
| 5,689,549 A | 11/1997 | Bertocci et al. | | |
| 5,890,069 A * | 3/1999 | Evans | ................... | H04M 1/733 455/560 |
| 6,128,504 A * | 10/2000 | Ciccone | ............ | H04M 1/72505 455/462 |
| 2010/0062766 A1* | 3/2010 | Cook | ................ | H04M 1/72502 455/435.1 |
| 2011/0003577 A1* | 1/2011 | Rogalski | ............... | H04W 4/025 455/404.1 |
| 2017/0127364 A1* | 5/2017 | Shibuta | ............. | H04W 72/0446 |
| 2017/0164294 A1* | 6/2017 | Dickinson | ............. | H04W 76/10 |

FOREIGN PATENT DOCUMENTS

| | | |
|---|---|---|
| EP | 0899928 A2 | 3/1999 |
| EP | 3771189 A1 | 1/2021 |

OTHER PUBLICATIONS

International Search Report and Written Opinion from PCT/IB2022/000766, May 9, 2023, 16 pages.

* cited by examiner

*Primary Examiner* — Raymond S Dean
(74) *Attorney, Agent, or Firm* — STEPTOE LLP; Carl B. Wischhusen

(57) ABSTRACT

A telecommunications system includes a base, a plurality of handsets, and a status database for storing status information. Each handset is localized to the base. The status information may be that of a first handset of the plurality of handsets. The base broadcasts to the plurality of handsets a status broadcast that includes the status information.

26 Claims, 6 Drawing Sheets

WIRELESS COMMUNICATIONS SYSTEM AND METHOD

BACKGROUND

Organizations or enterprises, for example, workplaces, schools, or hospitals, often use wireless communication systems that include portable communication devices, such as portable telephone handsets, that are able to roam throughout the system and provide users mobility. Organizations or enterprises also use communication systems and communication devices that may have features relating to monitoring the status of other communication devices of the system and monitoring the status of communication lines shared by the communication devices of the system. Such systems may require a backend centralized server of a private branch exchange ("PBX") system or a single control hub for the communication devices.

DETAILED DESCRIPTION

Figure 1:
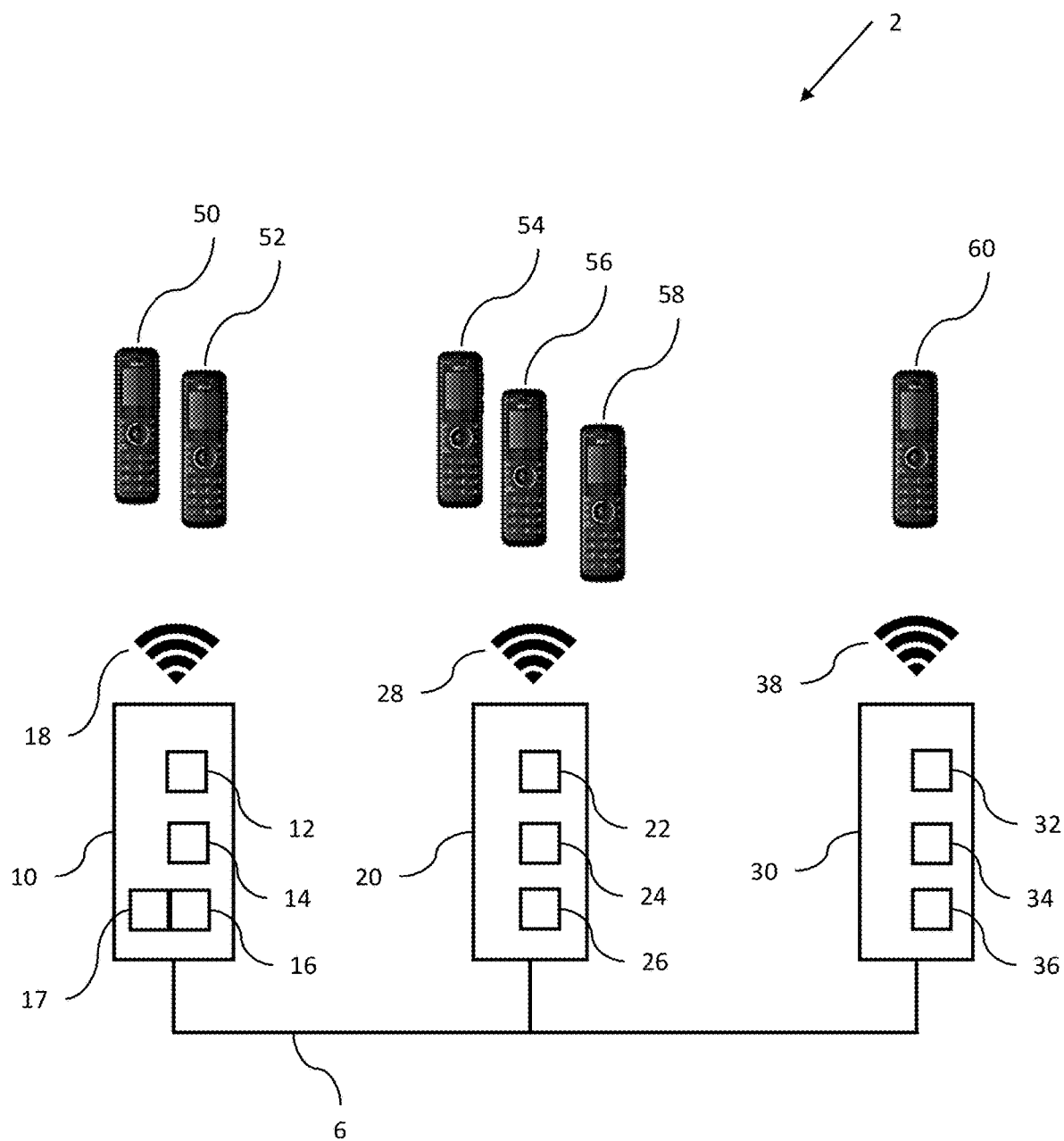
FIGS. 1-4 are schematic system diagrams of exemplary multi-cell DECT systems.

The following disclosure provides different embodiments, or examples, for implementing different features of the subject matter. Specific examples of components, features, arrangements, or steps are described below to simplify the present disclosure. These are, of course, merely examples and are not intended to be limiting.

Besides the communication systems described in the Background section, there are systems that do not have a backend centralized server of a PBX or a single control hub for the communication devices. But these systems also would like to offer monitoring features as described above.

The inventors have developed wireless communication systems and methods that involve, for example, at least one base (or base station), a plurality of handsets, where the handsets are portable and each handset is localized to a base, and a status database for storing status information. The status information may be that of a first handset of the plurality of handsets, a line shared among at least two handsets of the plurality of handsets, or both. The base(s) may broadcast to the plurality of handsets a status broadcast that includes the status information. Each handset may thus have the capability, without server support, to be aware of, monitor, and indicate the status of other handsets in the system and/or the status of shared line instances shared by the handsets.

In one embodiment, the invention may include a wireless communications system, such as a Digital Enhanced Cordless Telecommunications ("DECT") system. Although DECT systems are described herein, it should be understood that the invention may encompass or be applicable to other types of telecommunications systems, such as wireless telecommunication systems that use Wi-Fi or some other wireless standard.

DECT is a standard for wireless communications, for example, between a DECT base station ("base") and one or more portable communication devices, such as a portable handset (e.g., portable telephone), which are connected or "localized" to the base. (References to a "handset" herein should be understood to encompass, or be substitutable with, any appropriate portable communication device.) The DECT standard provides for a portable handset to wirelessly connect and communicate with a base, and the base may then connect to and communicate with a communication system or network, such as the public switched telephone network ("PSTN"), a Voice Over Internet Protocol ("VoIP") connection, or a PBX. For example, the base may communicate with an IP-based PBX using Session Initiation Protocol ("SIP") and Real-Time Transmission Protocol ("RTP") protocols, and the base may connect to an IP-based PBX via a local area network ("LAN"), for example, using a Wi-Fi connection or Ethernet connection. In one example, the base may connect to and communicate through one or more lines. (References to a "line" herein should be understood to encompass any telecommunications line or channel for transmitting communications (e.g., voice, text, or data communications), such as a physical or hardwired phone line (e.g., cable or fiber optic), a wireless or digital line, a line via the internet (e.g., a VoIP line), a line instance (e.g., a VoIP line instance), or a phone number or extension.) For example, the base may connect to and communicate through one or more VoIP lines, where each VoIP line includes multiple line instances such that the base can provide for two or more handsets localized to the base to each simultaneously engage in a separate session (e.g., call) on a separate line instance.

In one embodiment, the communication system may be a single-cell communication system or a multi-cell communication system. For example, a DECT system may be implemented as a single-cell DECT system that includes one base or a multi-cell DECT system that includes two or more bases. A single-cell DECT system may support a plurality of portable handsets, and each handset in the plurality of handsets may be connected or "localized" to the single base of the single-cell system. A multi-cell DECT system may support a plurality of portable handsets, and each handset in the plurality of handsets may be connected or "localized" to one base in the multi-cell system. As a portable handset in a multi-cell DECT system is moved from a first location within range of a first base to a second location within range of a second base, the handset may undergo a handoff in which it changes from being first localized to the first base to being subsequently localized to the second base. The single base of a single-cell DECT system and each base of a multi-cell DECT system may be connected to and communicate with a communication system or network. For example, the single base of a single-cell DECT system and each base of a multi-cell DECT system, such as two or more bases of a multi-cell DECT system, may connect to and communicate with and through an IP-based PBX. In one example, each handset of a single-cell or multi-cell DECT system may be assigned a designated ID (e.g., telephone number) as an extension of a communication system or network (e.g., PBX).

Portable communication devices in some wireless telecommunications systems may not have conventional busy lamp field ("BLF") capabilities and/or conventional key line emulation ("KLE") capabilities. For example, because DECT handsets are not IP endpoints that communicate with a communication system or network via SIP protocol, but rather communicate with bases via DECT protocol, DECT handsets do not have busy monitoring ("BM") capabilities such as, or similar to, conventional BLF capabilities. And because of the dynamic structure and call routing in multi-cell DECT systems, DECT handsets also do not have conventional KLE capabilities. In one embodiment, the invention provides BM and KLE capabilities and features to portable handsets in DECT systems, for example, using a shared status database and universal DECT status broadcast. Such BM and KLE capabilities do not require centralized server support.

BM capabilities may include a first handset's ability to monitor the status of one or more other communication devices (e.g., another DECT handset), one or more indicators on the first handset to show the status of the one or more monitored communication devices, one or more keys on the first handset to allow the first handset to engage with the one or more monitored devices, and a configuration tool or process through which the first handset is configured to monitor and engage with the one or more monitored devices. In one embodiment, BM capabilities may be line independent. For example, BM capabilities may include the ability to monitor the status of another communication device independent of which line (e.g., VoIP line) the monitored device is associated with.

KLE capabilities may include a first handset's ability to monitor the status of one or more shared lines or line instances (e.g., VoIP line instances shared among multiple DECT handsets), one or more indicators on the first handset to show the status of the one or more monitored line instances, one or more keys on the first handset to allow the first handset to engage with the one or more line instances (e.g., to make, receive, hold, or barge in on a call on a shared line instance), and a configuration tool or process through which the first handset is configured to monitor and engage with the one or more monitored line instances.

The systems and methods described herein improve the functioning of single-cell or multi-cell DECT systems and the portable handsets thereof by, for example, providing BM and KLE capabilities and features to facilitate more efficient and flexible communication to, from, and between users of such systems and handsets.

Figure 2:
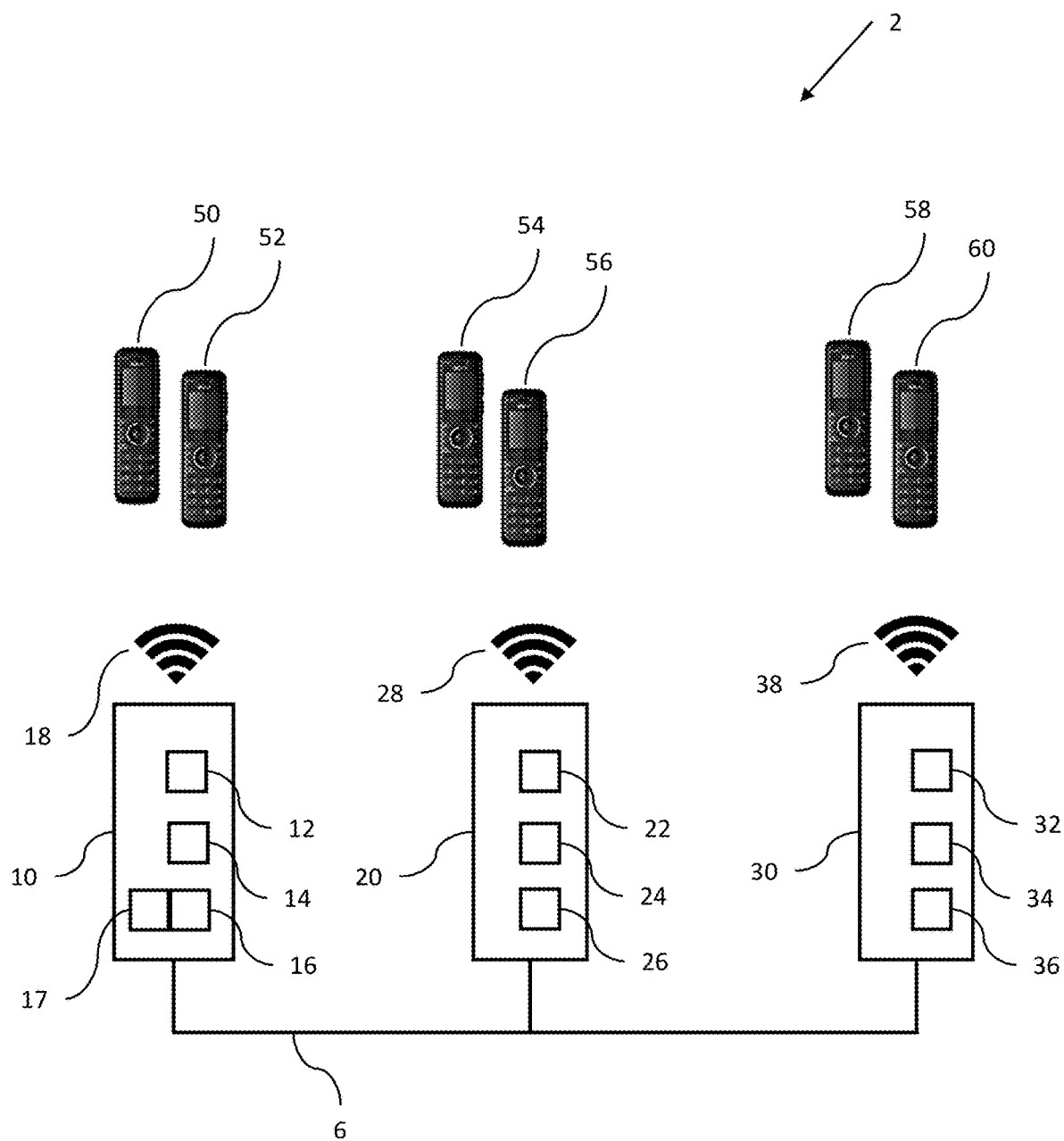

FIGS. 1 and 2 show a schematic system diagram of an exemplary multi-cell DECT system 2. Multi-cell DECT system 2 includes first base 10, second base 20, and third base 30, which are connected via a communication network 6. In one embodiment, communication network 6 can be a LAN and first, second, and third bases 10, 20, 30 can be connected to network 6 via Wi-Fi or Ethernet connections. In one embodiment, communication network 6 can be an IP-based PBX.

In one embodiment, the bases of a multi-cell DECT system may include a primary or "master" base and one or more secondary or "slave" bases. For example, the multi-cell DECT system may include one primary base and all other bases may be secondary bases. In one example, first base 10 of multi-cell DECT system 2 may be a primary base and second and third bases 20, 30 may be secondary bases. In one embodiment, a multi-cell DECT system connects to and communicates with an external communication system or network via the primary base. For example, one or more shared VoIP lines or line instances may connect to and communicate through a primary base, such that communication with a secondary base over a shared line or line instance is performed or routed through the primary base. In one embodiment, a multi-cell DECT system connects to and communicates with one or more external communication systems or networks via two or more bases, such as two or more secondary bases or both a primary base and one or more secondary bases. For example, one or more VoIP lines or line instances may connect to and communicate through a primary base and one or more VoIP lines or line instances may connect to and communicate through a secondary base, such that external calls may be made directly to and/or from the secondary base.

Multi-cell DECT system 2 includes a plurality of portable handsets 50, 52, 54, 56, 58, 60. FIG. 1 shows first and second handsets 50, 52 localized to first base 10; third, fourth, and fifth handsets 54, 56, 58 localized to second base 20; and sixth handset 60 localized to third base 30. Each of these handsets is wireless and portable and may be moved. For example, while fifth handset 58 is shown localized to second base 20 in FIG. 1, fifth handset 58 may be moved such that it goes from within range of second base 20 to within range of third base 30 and becomes localized to third base 30, as shown in FIG. 2, via a handoff.

In one embodiment, a single-cell or multi-cell DECT system may include a status database. First, second, and third bases 10, 20, 30 of multi-cell DECT system 2 include first, second, and third status databases 12, 22, 32, respectively. Together, first, second, and third status databases 12, 22, 32 collectively form a distributed or decentralized status database. For example, each base in the multi-cell DECT system may include and maintain a copy of the distributed status database. The distributed status database made up of first, second, and third status databases 12, 22, 32 may be updated, synchronized, and maintained using replication or duplication.

The status database may store and share status information across the system in real-time, such as handset locations, handset statuses, shared line instance statuses, or changes to any such information. Handset location information may include, for example, that first handset 50 is localized to first base 10. Handset location information may be used, for example, to route calls through multi-cell DECT system 2. Handset status information may be used for BM capabilities and may include, for example, that handset 50 has one of the following statuses: not in use, such as idle; in use, such as on a call, on hold, ringing, or dialing; do not disturb; low battery; powered off; out of range of a base; or other status. Shared line instance status information may be used for KLE capabilities and may include, for example, that a shared line instance has one of the following statuses: not in use, such as idle; in use, such as a call with a handset at issue, a call with another handset, a call that is on hold, ringing from an incoming call, dialing with a handset at issue, dialing with another handset, or a call in which a handset has barged in; or other status.

In one embodiment, status information may be transmitted or broadcast from a base in a single-cell or multi-cell DECT system to one or more handsets localized to the base, such as all handsets localized to the base. In one embodiment, status information may be universally relayed from each base in a multi-cell system to each handset localized to that respective base, and the status information may be relayed as a status broadcast, such as via one or more dedicated broadcast channels. FIG. 1 shows first, second, and third bases 10, 20, 30 broadcasting first, second, and third status broadcasts 18, 28, 38, respectively. Together, first, second, and third status broadcasts 18, 28, 38 collectively constitute a universal status broadcast of multi-cell DECT system 2. In one embodiment, the status broadcast is broadcast by two or more bases of the multi-cell DECT system, such as all bases of the system. In one embodiment, each base from which the status broadcast is broadcast may broadcast the same status information or status broadcast.

In one embodiment, each base from which the status broadcast is broadcast may broadcast the status broadcast to each handset localized to that respective base. For example, for the structure of multi-cell DECT system 2 shown in FIG. 1, first base 10 broadcasts first status broadcast 18 to first and second handsets 50, 52; second base 20 broadcasts second status broadcast 28 to third, fourth, and fifth handsets 54, 56, 58; and third base 30 broadcasts third status broadcast 38 to sixth handset 60. In another example, for the structure of multi-cell DECT system 2 shown in FIG. 2, first base 10 broadcasts first status broadcast 18 to first and second handsets 50, 52; second base 20 broadcasts second status broadcast 28 to third and fourth 54, 56; and third base 30 broadcasts third status broadcast 38 to fifth and sixth handsets 58, 60.

In one embodiment, the status broadcast may be broadcast to handsets on one or more dedicated or dynamic DECT channels. In one embodiment, a base may broadcast the status broadcast to handsets localized to that base using one or more DECT channels. In one example, a base may use the same DECT channel to broadcast the status broadcast to two or more handsets localized to the base, such as all handsets localized to the base, and that DECT channel may be a dedicated static channel or a dynamic channel. In one example, a base may use different DECT channels to broadcast the status broadcast to two or more handsets localized to the base, such as different channels for each handset localized to the base, and the DECT channel for each particular handset may be a dedicated static channel or a dynamic channel. In one embodiment, two or more bases may each broadcast the status broadcast using one or more DECT channels that are the same or different between the two or more bases. In one embodiment, the same dedicated or dynamic DECT channel may be used by each base broadcasting the status broadcast. In one embodiment, two or more bases may use different dedicated or dynamic DECT channels to broadcast the status broadcast. For example, a different dedicated DECT channel may be used by each base broadcasting the status broadcast. In one embodiment, each base broadcasting the status broadcast may use the "dummy bearer" broadcast method to simultaneously broadcast the status broadcast to the localized handsets. In one example, a certain DECT channel may be the combination of a radio channel and TDM time slot, which may help to avoid cross interference.

In one embodiment, one or more handsets of a single-cell or multi-cell DECT system, such as all handsets of the system, listen for or receive the status broadcast. For example, handsets of the single-cell or multi-cell DECT system may listen to the one or more dedicated DECT channels used for the status broadcast. In one embodiment, the status broadcast is broadcast continually. In one embodiment, the status broadcast is broadcast periodically, such as every 30, 15, 10, 5, 1, or 0.5 seconds. In one embodiment a handset may actuate or "wake up" its receiver periodically to receive the status broadcast and/or check for other information or updates (e.g., check for calls). In one embodiment, reception of the status broadcast by a handset is an unacknowledged protocol, for example, that does not wake up the handset's transmitter to transmit back to the base.

In one embodiment, the status broadcast may contain and relay status information, such as status information from the status database, as discussed above. For example, the status broadcast may relay status information to a handset such as handset location information, handset status information, shared line instance status information, and/or changes to any such location, handset status, and/or shared line instance status information.

In one embodiment, the status broadcast may include limited information. For example, the information included in the status broadcast may be limited to status updates, such as location information, handset status information, or shared line instance status information that has changed. For example, the status broadcast may broadcast status information only when that status information is changed or updated in the status database. In one embodiment, the status broadcast is dynamic. For example, the timing and/or content of the broadcast may be varied. In one example, the timing and/or content of the status broadcast is based on when and/or what status information is updated. For example, the status broadcast may be broadcast in response to status information in the status database being updated. For example, the status broadcast may relay a packet that includes only status information that has been updated in the status database (e.g., a handset status or shared line instance status that is updated from idle to in use). This dynamic aspect of the status broadcast improves energy and payload efficiencies.

In one embodiment, a status broadcast that is broadcast from a particular base may include only status information relevant to the handsets localized to that base at the time of that broadcast. For example, for the structure of multi-cell DECT system 2 shown in FIG. 1, first status broadcast 18 relayed from first base 10 may contain a packet of status information that is relevant only to first and second handsets 50, 52. In one embodiment, whether status information is relevant to a particular handset may depend on configurations, such as the handset's BM configuration(s) or KLE configuration(s), discussed below.

In one embodiment, a single-cell or multi-cell DECT system may include configurations (e.g., registrations, associations, or assignments) for BM capabilities and/or KLE capabilities. In one embodiment, a single-cell or multi-cell DECT system, a handset therein, or some configuration component of the system may be configured for the handset to include BM capabilities, for example, such that the handset is registered, associated, or assigned to monitor or receive status information of one or more certain other target handsets. In one embodiment, a single-cell or multi-cell DECT system, a handset therein, or some configuration component of the system may be configured for the handset to include KLE capabilities, for example, such that the handset is registered, associated, or assigned to one or more certain shared lines or line instances and capable of monitoring or receiving status information for the one or more shared lines or line instances.

In one embodiment, a single-cell or multi-cell DECT system may include a configuration database. First, second, and third bases 10, 20, 30 include first, second, and third configuration databases 14, 24, 34, respectively. Together, first, second, and third configuration databases 14, 24, 34 collectively form a distributed or decentralized configuration database of multi-cell DECT system 2. For example, each base in the multi-cell DECT system may include and maintain a copy of the distributed configuration database. The distributed configuration database made up of first, second, and third configuration databases 14, 24, 34 may be updated, synchronized, and maintained using replication or duplication.

In one embodiment, the configuration database may store configuration information. For example, the configuration database may store and share configuration information across the system in real-time, such as handset configuration information. In one embodiment, configuration information may include SIP configurations, BM configurations, KLE configurations, and/or handset operational and feature configurations (e.g., configurations regarding keys and indicators), for example, for handsets of a single-cell or multi-cell DECT system. In one embodiment, such configuration information is intended, designated, and used for internal configurations, such as registrations, associations, or assignments within the single-cell or multi-cell DECT system, and not configurations external to the system, such as registrations with an external system or server. In one embodiment, one or more configurations regarding a particular handset is available to the handset from any base in a multi-cell DECT system. For example, the handset may roam from a first base to a second base in the system and still be able to retrieve or receive its configurations from the second base based on its configurations being stored in a configuration database distributed across both the first base and the second base.

A SIP configuration may be an assignment or association of a DECT handset to a private SIP account. In one embodiment, each DECT handset has a SIP configuration for a handset extension. For example, first and second handsets 50, 52 may each have SIP configurations such that each is assigned an extension identification (e.g., an extension phone number). In one embodiment, for SIP accounts for handsets of a multi-cell DECT system are connected through a primary base for external calls, such that external calls to a handset's SIP account is directed to the primary base and then directed either to the handset over DECT protocol, if the handset is localized to the primary base, or to the secondary base to which the handset is localized, which then directs the call to the handset over DECT protocol.

A BM configuration may be a configuration of a handset to have BM capabilities with respect to one or more certain other handsets, such as an assignment to monitor and indicate the status of the one or more certain other handsets. For example, a BM configuration may assign a certain indicator or key of first handset 50 to indicate the handset status of fifth handset 58.

A KLE configuration may be a configuration of a handset to have KLE capabilities with respect to one or more certain shared lines or line instances, such as an assignment to have access to use the one or more certain other lines or line instances and to monitor and indicate the status of the one or more certain other lines or line instances. For example, a KLE configuration may assign a certain indicator or key of first handset 50 to indicate the shared line instance status of a line instance shared between first handset 50 and one or more other handsets of multi-cell DECT system 2.

In one embodiment, configuration information, such as SIP configurations, BM configurations, and KLE configurations, may be set, entered, received from, or changed via handset(s), via a non-handset user interface of the DECT system, or via an external connection to the DECT system. For example, configuration information via an external connection may be received from an online user interface (e.g., website). In one example, configuration information is entered via a website and then transmitted (e.g., via the Internet or a LAN) to the DECT system, which then relays the configuration information to, and stores it in, the configuration database. For example, configuration information stored in first, second, and third configuration databases 14, 24, 34 may be input and received from the plurality of handsets 50, 52, 54, 56, 58, 60 or, if multi-cell DECT system 2 has an external connection to an IP-based network, from a website on the Internet. In one example, a multi-cell DECT system's external connection is to a primary base, and the configuration information is received via the external connection by the primary base, which then transmits the configuration to the one or more secondary bases.

In one embodiment, a handset may store or use the configuration information to configure the handset (e.g., to configure indicators or keys of the handset). For example, a handset may use BM configuration information to configure one or more BM indicators or keys to indicate the handset status of certain other handsets. For example, a handset may use KLE configuration information to configure one or more KLE indicators or keys to indicate the shared line instance status of certain shared line instances.

In one embodiment, a handset may receive the configuration information via direct input of the configuration information through the handset. In one embodiment, a handset may receive the configuration information from the configuration database. For example, first base 10 may transmit configuration information from first configuration database 14 to first handset 50. In one example, configuration information is transmitted from the configuration database to handsets of the system either through individual connections to each handset, via the base to which a handset is localized, or through a broadcast. In one example, such a broadcast of configuration information may contain configuration information relevant to all handsets of the multi-cell DECT system. In one example, such a broadcast of configuration information contains configuration information on a per-base basis, i.e., each base broadcasts only configuration information relevant to the handsets that are localized to that base.

In one embodiment, the configuration database may be used to determine whether a base should broadcast the status broadcast and if so, what status information to include in the status broadcast. For example, for first base 10, BM and KLE configurations stored in first configuration database 14 for first and second handsets 50, 52, which are localized to first base 10, may be analyzed to determine what status information from first status database 12 is relevant and should be included in dynamic first status broadcast 18. First status broadcast 18 may then be updated to include only status information relevant to first and second handsets 50, 52, based on the BM and KLE configurations for those two handsets. For example, if a call is received for fifth handset 58 on a certain shared line instance, first base 10 may access configuration information in first configuration database 14 to assess whether first and second handsets 50, 52 are registered to receive handset status information for fifth handset 58, per their BM configurations (if any), or are registered to receive shared line instance status information for the shared line instance at issue, per their KLE configurations (if any), and if so, then such status information related to the incoming call may be included in first status broadcast 18.

In one embodiment, the configuration database of a multi-cell DECT system is a distributed database stored in one or more bases, such as all bases, that stores configuration information for one or more handsets, such as all handsets. In one example, a multi-cell DECT system includes a primary base and a primary configuration database specific to the primary base. For example, the primary configuration database may include external configuration information for external calls, such as external calls to or from handsets via either private SIP accounts or shared lines or line instances.

In one embodiment, the base of a single-cell DECT system may include a call control or each base of a multi-cell DECT system may include a call control. First, second, and third bases 10, 20, 30 include first, second, and third call controls 16, 26, 36, respectively. In one embodiment, a base's call control may process calls, and related information, sent from or received by the base using SIP and RTP protocols. In one embodiment, call controls of the bases in a multi-cell DECT system manage call routing within the system and external to the system, including when a portable handset on a call is relocated such that the handset is handed off from a first base to a second base. In one embodiment, a call control can be a VoIP processor. For example, for the structure of multi-cell DECT system 2 shown in FIG. 1, when fifth handset 58 makes a call to sixth handset 60, second call control 26 of second base 20 processes and routes the call to third base 30, where third call control 36 processes and receives the call, and a SIP/RTP session is established between second call control 26 and third call control 36 via communication network 6.

In one embodiment, call controls may manage messages transmitted between the bases of a multi-cell DECT system. For example, such messages may contain status information and/or configuration information transmitted to or from a base's status database and/or configuration database, respectively.

In one embodiment, a single-cell DECT system may include an external call control or a multi-cell DECT system may include one or more external call controls. For example, first base 10 of multi-cell DECT system 2 includes external call control 17. In one example, an external call control may be specific to a primary base in a multi-cell DECT system. In one embodiment, an external call control may process and route external calls and related information. In one example, external call control 17 may process and route an external call received by multi-cell DECT system 2 from an external caller, through an external communications system or network, and directed to a handset in system 2, such as third handset 54. In one example, external call control 17 may process and route an external call sent from multi-cell DECT system 2 (e.g., dialed by third handset 54) to an external caller, through an external communications system or network. For example, external call control 17 may be connected to an external line, such as an external VoIP line, via an external connection.

Figure 3:
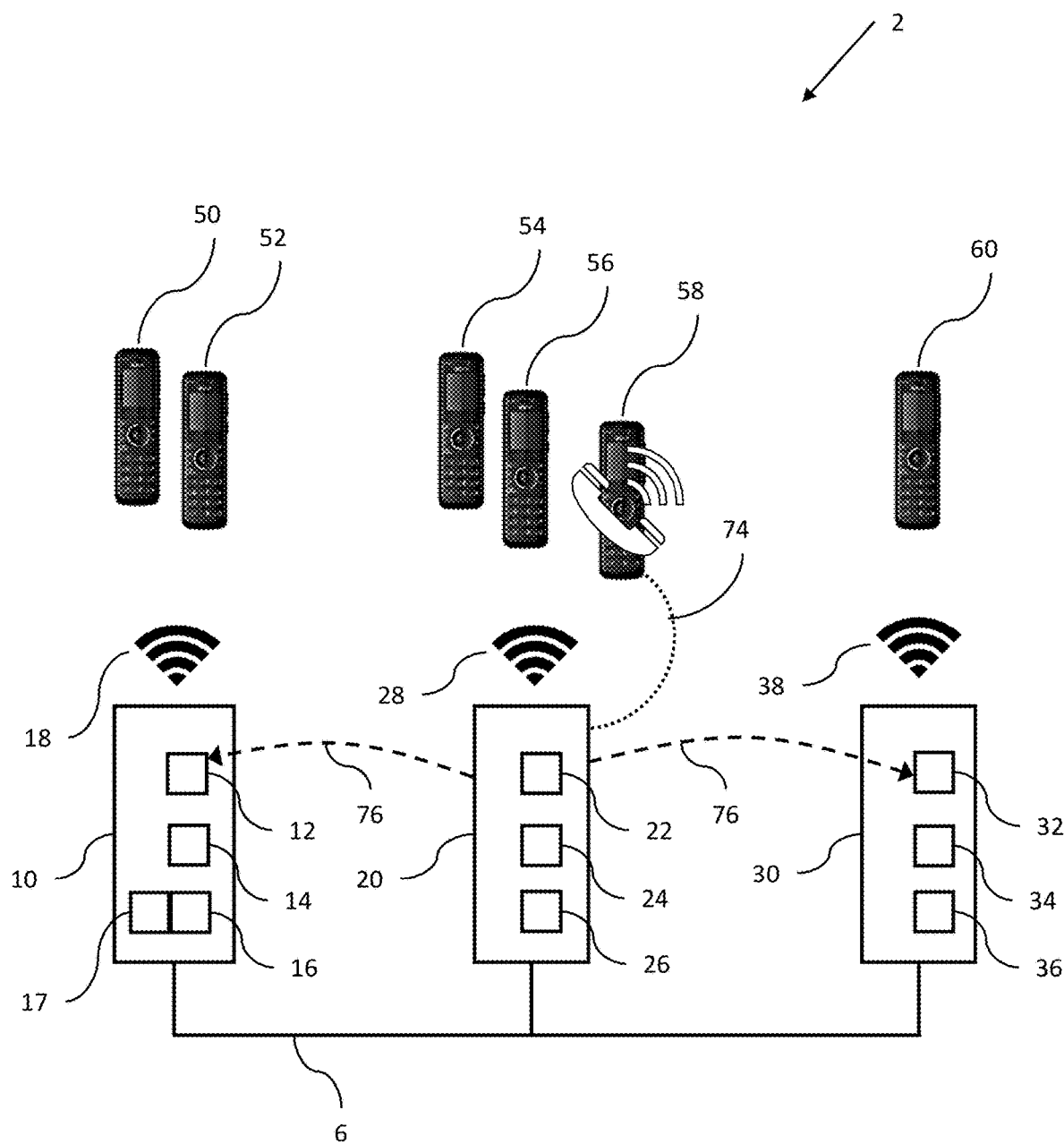

FIG. 3 shows another schematic system diagram of exemplary multi-cell DECT system 2. Similar to FIG. 1, multi-cell DECT system 2 of FIG. 3 includes first, second, and third bases 10, 20, 30, all connected via communication network 6, and with first and second handsets 50, 52 localized to first base 10; third, fourth, and fifth handsets 54, 56, 58 localized to second base 20; and sixth handset 60 localized to third base 30.

In FIG. 3, the handset status of fifth handset 58 has changed from idle to in use, and specifically, fifth handset 58 is on a call, which is set up by second call control 26. In one embodiment, each base monitors (e.g., is continuously or periodically aware of) the status of each handset localized to the base. In one embodiment, a base detects changes in the handset status of a handset localized to the base. For example, a base detects when a handset localized to the base changes from a first handset status (e.g., not in use, such as idle; in use, such as on a call, on hold, ringing, or dialing; do not disturb; low battery; powered off; out of range of a base; or other status) to a second handset status. The change in handset status of fifth handset 58 is detected by second base 20 via handset status detection 74.

In one embodiment, after second base 20 performs handset status detection 74 to detect the updated handset status of fifth handset 58, this updated status information for fifth handset 58 is stored in the distributed status database of multi-cell DECT system 2. For example, first, second, and third status databases 12, 22, 32 are updated with this new handset status information for fifth handset 58.

A multi-cell DECT system may employ various methods for updating or synchronizing a status database with new handset status information. In one embodiment, when a change in handset status is detected by a first base, then the first base may update its copy of the distributed status database with the updated handset status information and may transmit the updated handset status information to other bases of the multi-cell DECT system, each of which in turn updates its copy of the distributed status database with the updated handset status information transmitted by the first base. For example, when second base 20 performs handset status detection 74 to detect the updated handset status of fifth handset 58, base 20 (i) updates second status database 22 with this updated handset status information and (ii) transmits this updated handset status information via handset status update messages 76 to first and third bases 10, 30, which update first and third status databases 12, 32, respectively, with this updated handset status information.

In one embodiment, handset status update message 76 may be a direct message from base to base. For example, status update message 76 can consist of point-to-point messages from second base 20 to first and third bases 10, 30 through communication network 6 via TCP/IP (e.g., through Ethernet or Wi-Fi connections), as each base may know the IP address of the other bases. In one embodiment, handset status update message 76 may be a broadcast or multicast to the other bases of the multi-cell DECT system, for example, using a PBX network to which all bases of the system are connected. Handset status update message 76 may be an acknowledged protocol or an unacknowledged protocol.

In one embodiment, when a change in handset status is detected, then a designated base (e.g., a primary base) (i) updates a master copy of the status database, which may be stored or maintained by the designated base, with the updated handset status information and (ii) sends a handset status update message to all other bases (e.g., secondary bases). The handset status update message sent by the designated base to the other non-designated bases may contain a full copy of the updated master copy of the status database or may contain only the updated handset status information that was detected, which each non-designated base may use to update its copy of the status database to match the master copy. If the updated handset status information was detected by a base other than the designated base, then that base that detected the updated handset status information may transmit it to the designated base for the designated base to then update the master copy of the status database and send the handset status update message to the other bases. The non-designated base that detected the change in handset status may update its copy of the status database either with the updated handset status information that it detected or with the updated handset status information it receives via a handset status update message from the designated base. The handset status update message(s) sent by the designated base may be similar to handset status update message 76, described above.

In one embodiment, a designated base (e.g., a primary base) regularly (e.g., constantly or periodically) broadcasts a centralized status database to other bases (e.g., secondary bases) of a multi-cell DECT system. When a change in a handset status is detected, the designated base updates the centralized status database with the updated handset status information and continues to broadcast the status database. If the updated handset status information is detected by a base other than the designated base, then the base that made the detection sends the updated handset status information to the designated base for the designated base to update the centralized status database.

Once the status database is updated—e.g., once distributed copies of the status database are updated or once a centralized status database has been broadcast—the new handset status information that was detected and updated in the status database may be broadcast by the status broadcast, as described above. For example, after first base 10 receives the updated handset status information of fifth handset 58 via handset status update message 76 and first status database 12 is updated with this received status information, first base 10 may broadcast this status information (i.e., that fifth handset 58 is now on a call or that the handset status of fifth handset 58 changed from idle to on a call) to first and second handsets 50, 52 via first status broadcast 18. If either of first and second handsets 50, 52 is configured with a BM configuration to monitor or receive status updates from fifth handset 58, then that handset may indicate the updated handset status of fifth handset 58, received via first status broadcast 18.

Figure 4:
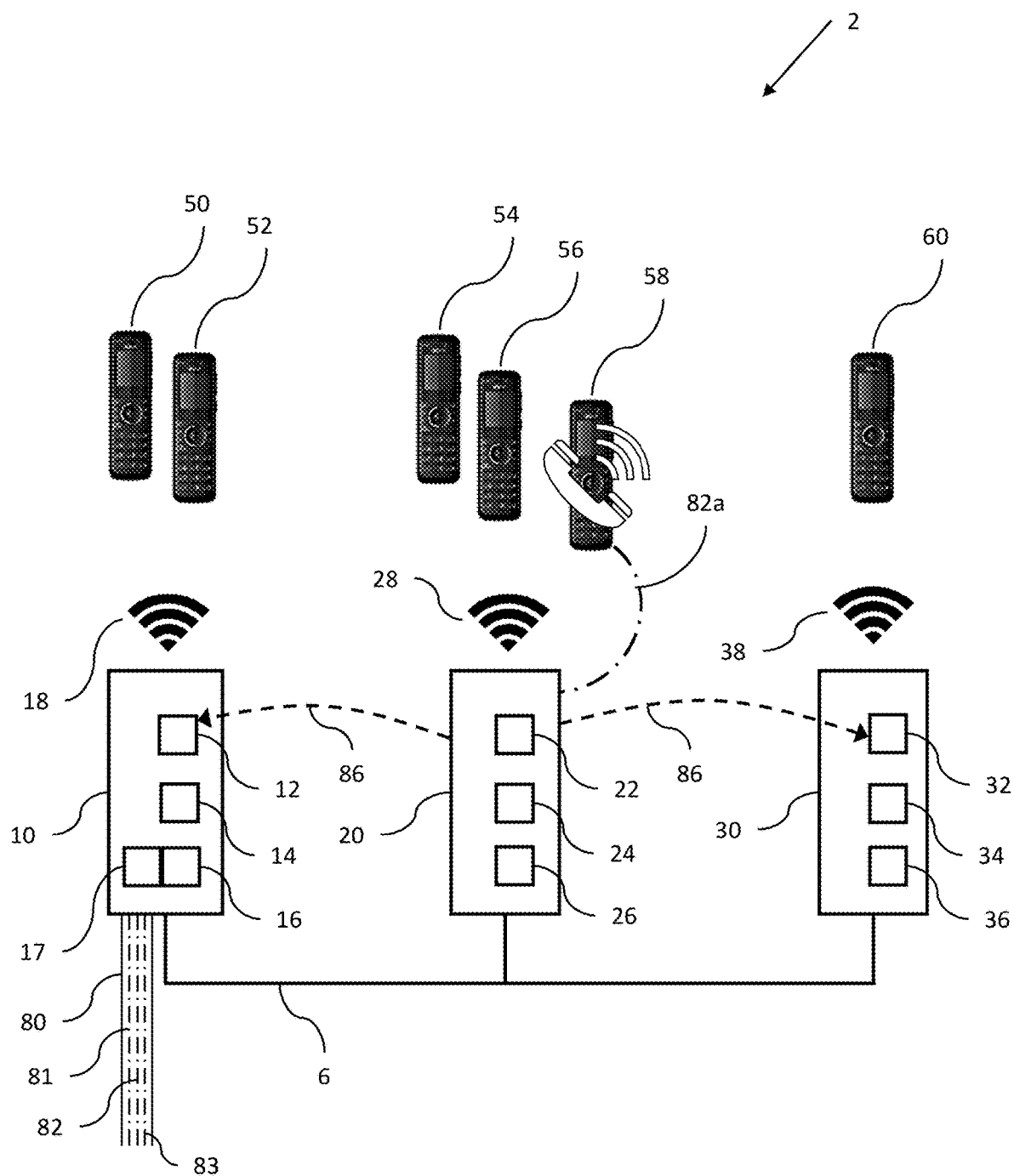

FIG. 4 shows another schematic system diagram of exemplary multi-cell DECT system 2. Similar to FIG. 1, multi-cell DECT system 2 of FIG. 4 includes first, second, and third bases 10, 20, 30, all connected via communication network 6, and with first and second handsets 50, 52 localized to first base 10; third, fourth, and fifth handsets 54, 56, 58 localized to second base 20; and sixth handset 60 localized to third base 30.

In FIG. 4, shared VoIP line 80 is connected to first base 10, and first, second, and third shared line instances 81, 82, 83 are shared among any handsets of multi-cell DECT system 2 with KLE configurations to use those shared line instances 81, 82, 83. For example, shared VoIP line 80 may support three separate simultaneous calls to handsets in multi-cell DECT system 2, with each call on one of first, second, and third shared line instances 81, 82, 83. A handset in multi-cell DECT system 2 may be registered for some or all of first, second, and third shared line instances 81, 82, 83, and any handset with a KLE configuration for a shared line instance may use and/or monitor the status of that shared line instance. For example, third and fourth handsets 54, 56 may both be registered for first shared line instance 81, and when an incoming call comes in on first shared line instance 81, both third and fourth handsets 54, 56 may receive the shared line instance status information of first shared line instance 81 (i.e., that there is an incoming call on the line).

In FIG. 4, fifth handset 58 had made an outgoing call, or picked up an incoming call, on second shared line instance 82, such that the shared line instance status of second shared line instance 82 has changed to in use, and specifically, to on a call involving fifth handset 58.

A multi-cell DECT system may employ various methods for detecting a shared line instance status or a change thereof. In one embodiment, a change in shared line instance status may be detected by a base with an external connection to the shared line instance in which the status change occurs. For example, shared line instances may all be connected to a multi-cell DECT system through a primary base, and the primary base may detect changes in shared line instance statuses. For example, in FIG. 4, a change in the shared line instance status of second shared line instance 82 may be detected by first base 10, which includes an external connection to shared VoIP line 80. In one embodiment, a change in shared line instance status may be detected by a base associated with a handset involved in the change in shared line instance status. For example, where a certain handset makes, receives, or answers a call on a shared line instance, that change in shared line instance status may be detected by the base to which that certain handset is localized. For example, in FIG. 4, second base 20, to which fifth handset 58 is localized, detects the detected call 82a that fifth handset 58 has made or picked up on second shared line instance 82.

A multi-cell DECT system may employ various methods for updating or synchronizing a status database with new shared line instance status information. Such methods are similar to the methods described above that a multi-cell DECT system may employ for updating a status database with new handset status information. In one embodiment, when a change in shared line instance status is detected by a first base, then the first base may update its copy of the distributed status database with the updated shared line instance status information and may transmit that updated information to other bases of the multi-cell DECT system, each of which in turn updates its copy of the distributed status database with the updated shared line instance status information transmitted by the first base. For example, when second base 20 detects call 82a on second shared line instance 82, base 20 (i) updates second status database 22 with this updated shared line instance status information and (ii) transmits this updated information via line instance status update messages 86 to first and third bases 10, 30, which update first and third status databases 12, 32, respectively, with this updated shared line instance status information regarding second shared line instance 82.

In one embodiment, line instance status update message(s) 86 may be similar to handset status update message(s) 76. For example, line instance status update message 86 may be a direct message from base to base, such as point-to-point messages from second base 20 to first and third bases 10, 30 through communication network 6 via TCP/IP, or may be a broadcast or multicast to other bases of the multi-cell DECT system. Line instance status update message 86 may be an acknowledged protocol or an unacknowledged protocol.

In one embodiment, when a change in a shared line instance status is detected, then a designated base (e.g., a primary base) (i) updates a master copy of the status database, which may be stored or maintained by the designated base, with the updated shared line instance status information and (ii) sends a line instance status update message to all other bases (e.g., secondary bases). The line instance status update message sent by the designated base to the other non-designated bases may contain a full copy of the updated master copy of the status database or may contain only the updated shared line instance status information that was detected, which each non-designated base may use to update its copy of the status database to match the master copy. If the updated shared line instance status information was detected by a base other than the designated base, then that base that detected that information may transmit it to the designated base for the designated base to then update the master copy of the status database and send the line instance status update message to the other bases. The non-designated base that detected the change in shared line instance status may update its copy of the status database either with the updated status information that it detected or with the updated status information it receives via a line instance status update message from the designated base. The line instance status update message(s) sent by the designated base may be similar to line instance status update message 86, described above.

In one embodiment, a designated base (e.g., a primary base) regularly (e.g., constantly or periodically) broadcasts a centralized status database to other bases (e.g., secondary bases) of a multi-cell DECT system. When a change in a shared line instance status is detected, the designated base updates the centralized status database with the updated shared line instance status information and continues to broadcast the status database. If the updated shared line instance status information is detected by a base other than the designated base, then the base that made the detection sends that updated status information to the designated base for the designated base to update the centralized status database.

Once the status database is updated—e.g., once distributed copies of the status database are updated or once a centralized status database has been broadcast—the new shared line instance status information that was detected and updated in the status database may be broadcast by the status broadcast, as described above. For example, after third base 30 receives via line instance status update message 86 the updated shared line instance status information regarding second shared line instance 82 and third status database 32 is updated with this received status information, third base 30 may broadcast this status information (i.e., that second shared line instance 82 is now in use for a call or that the status of second shared line instance 82 changed from idle to on a call) to sixth handset 60 via third status broadcast 38. If sixth handset 60 is configured with a KLE configuration to use and monitor or receive status updates regarding second shared line instance 82, then sixth handset 60 may indicate the updated shared line instance status of second shared line instance 82, received via third status broadcast 38.

Figure 5:
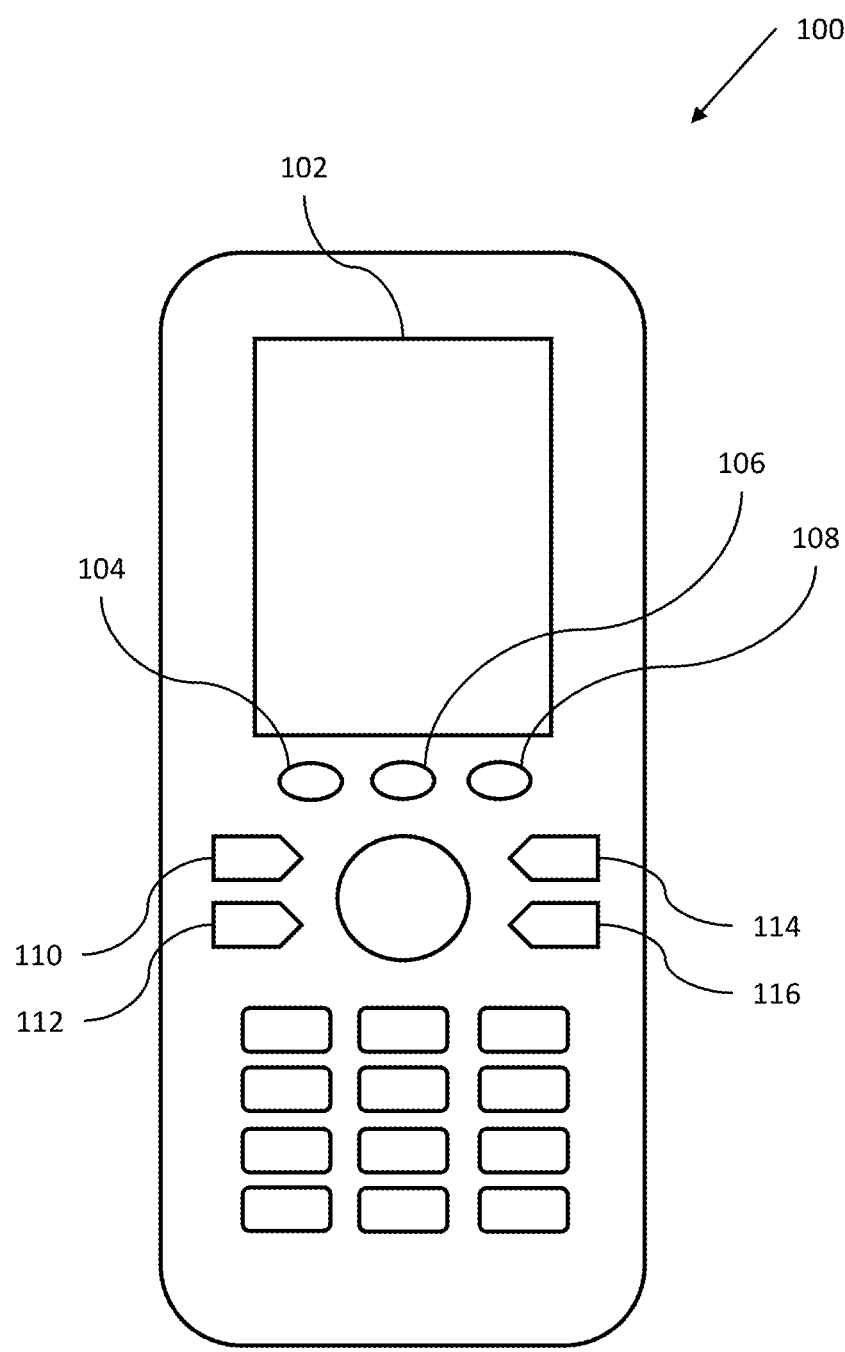
FIG. 5 is a front view of an exemplary portable DECT handset.

FIG. 5 shows a front view of an exemplary portable DECT handset 100. Handset 100 is wireless and includes display screen 102; first, second, and third BM keys 104, 106, 108; and first, second, third, and fourth KLE keys 110, 112, 114, 116. Handset 100 exhibits the functionalities of portable DECT handsets described herein. For example, handset 100 may be localized to different bases in a multi-cell DECT system depending on its location.

In one embodiment, first, second, and third BM keys 104, 106, 108 ("the handset 100 BM keys") may be indicators, include indicators, or be capable of indicating, for example, to indicate handset status information, as described herein. In one embodiment, the handset 100 BM keys may indicate handset status information of one or more other handsets in a single-cell or multi-cell DECT system that includes handset 100. For example, first BM key 104 may indicate handset status information for a first other handset, second BM key 106 may indicate handset status information for a second other handset, and third BM key 108 may indicate handset status information for a third other handset. In one embodiment, handset 100, or the DECT system that includes handset 100, may be configured with BM configurations, as described herein. For example, the BM configurations for handset 100 may register or assign one or more of the handset 100 BM keys to each correspond to—i.e., to monitor and display handset status information of—a certain other handset of the system.

In one embodiment, the handset 100 BM keys may indicate handset status information via a BM key itself or via display screen 102. For example, an indication by first BM key 104 via display screen 102 may include a displayed indicator or graphic that is associated with first BM key 100, is positioned on display screen 102 proximate to first BM key 104, and/or is actuated or selected for display on display screen 102 by first BM key 104. In one embodiment, the handset 100 BM keys may indicate handset status information constantly or only when actuated. In one embodiment, the handset 100 BM keys may provide various different indications (e.g., lights, noises, colors, patterns, shapes, symbols, letters, graphics, icons, numbers, etc.), and each different indication may correspond to a different handset status. For example, first BM key 104 may blink red to indicate that a certain other handset is on a call or may display a constant green light to indicate that the certain other handset is idle.

In one embodiment, pressing or actuating one of the handset 100 BM keys may produce an indication of the handset status information of a certain other handset that corresponds to the key via BM configuration or may initiate a call from handset 100 to such a certain other handset.

In one embodiment, first, second, third, and fourth KLE keys 110, 112, 114, 116 ("the handset 100 KLE keys") may be indicators, include indicators, or be capable of indicating, for example, to indicate shared line or shared line instance status information, as described herein. In one embodiment, the handset 100 KLE keys may indicate shared line instance status information of one or more line instances for which handset 100 is registered and which may be shared among other handsets in a single-cell or multi-cell DECT system that includes handset 100. For example, first KLE key 110 may indicate shared line instance status information for a first shared line instance, second KLE key 112 may indicate shared line instance status information for a second shared line instance, third KLE key 114 may indicate shared line instance status information for a third shared line instance, and fourth KLE key 116 may indicate shared line instance status information for a fourth shared line instance. In one embodiment, handset 100, or the DECT system that includes handset 100, may be configured with KLE configurations, as described herein. For example, the KLE configurations for handset 100 may register or assign one or more of the handset 100 KLE keys to each correspond to—i.e., to engage and use and to monitor and display shared line instance status information of—a certain shared line instance of the system.

In one embodiment, the handset 100 KLE keys may indicate shared line instance status information via a KLE key itself or via display screen 102. For example, an indication by first KLE key 110 via display screen 102 may include a displayed indicator or graphic that is associated with first KLE key 110, is positioned on display screen 102 proximate to first KLE key 110, and/or is actuated or selected for display on display screen 102 by first KLE key 110. In one embodiment, the handset 100 KLE keys may indicate shared line instance status information constantly or only when actuated. In one embodiment, the handset 100 KLE keys may provide various different indications (e.g., lights, noises, colors, patterns, shapes, symbols, letters, graphics, icons, numbers, etc.), and each different indication may correspond to a different shared line instance status. For example, first KLE key 110 may blink red to indicate that a certain shared line instance is in use by another handset for call or may display a constant green light to indicate that the certain shared line instance is idle and available for handset 100 to make a call.

In one embodiment, pressing or actuating one of the handset 100 KLE keys may produce an indication of the shared line instance status information of a certain shared line instance that corresponds to the key via KLE configuration or may engage with such a shared line instance. For example, pressing or actuating one of the handset 100 KLE keys may engage with a corresponding shared line instance by selecting the line instance (e.g., to dial a call on the line instance), picking up a call that is ringing or on hold on the line instance, or barging in on a current call on the line instance by another handset. In one embodiment, barge-in is a capability available to a handset that is registered for a certain shared line instance, and barge-in capability allows that handset to join a call on that shared line instance when the handset is not already a part of that call. In one example, a shared line instance's status information includes whether that shared line instance is in use for a call that is available for barge-in or a call that has already been barged-in.

Figure 6:
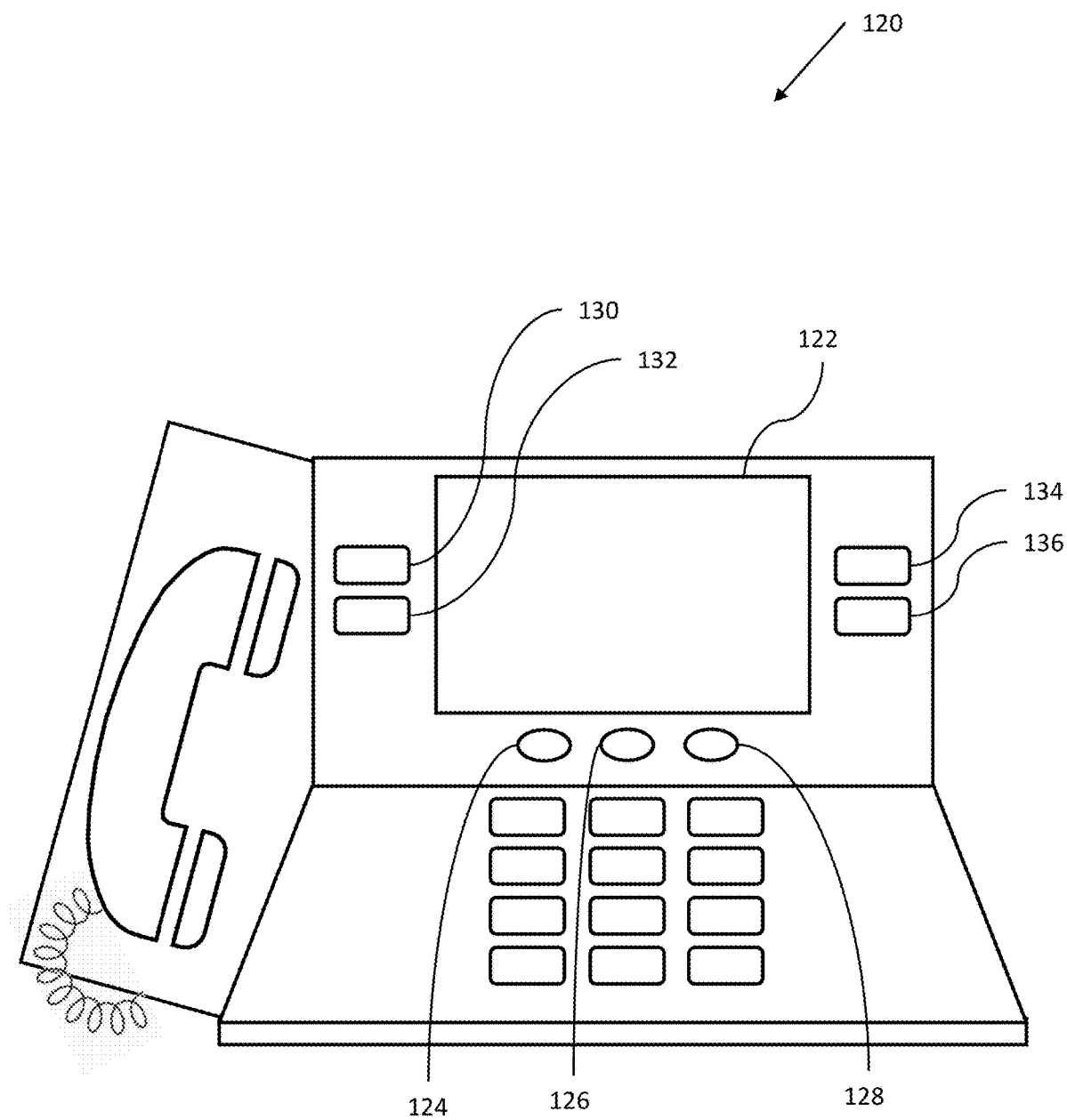
FIG. 6 is a front view of an exemplary portable DECT deskset.

FIG. 6 shows a front view of an exemplary portable DECT deskset 120. Deskset 120 may be wireless and includes display screen 122; first, second, and third BM keys 124, 126, 128; and first, second, third, and fourth KLE keys 130, 132, 134, 136. Portable deskset 120 exhibits the same functionalities as portable DECT handsets described herein. For example, deskset 120 may be localized to different bases in a multi-cell DECT system depending on its location.

The components of deskset 120 function the same as the components of handset 100, described above. For example, first, second, and third BM keys 124, 126, 128 of deskset 120 may include the same features and functionalities as first, second, and third BM keys 104, 106, 108 of handset 100, and first, second, third, and fourth KLE keys 130, 132, 134, 136 of deskset 120 may include the same features and functionalities as first, second, third, and fourth KLE keys 110, 112, 114, 116 of handset 100.

The present invention also includes a method for providing BM and KLE capabilities to portable handsets of a single-cell or multi-cell DECT system. In one embodiment, the method includes providing a single-cell or multi-cell DECT system as described herein. For example, the system may include a single base or two or more bases, and the system may include a plurality of handsets, with each handset localized to a base. For example, the system may include a status database, such as a status database that is distributed among the bases of the multi-cell system or stored in a designated base. For example, the system may include a configuration database, such as a configuration database that is distributed among the bases of the multi-cell system, stored in a designated base, or stored external to the system. For example, the system may be connected to one or more shared lines or shared lines instances, which may be shared among a plurality of handsets of the system.

In one embodiment, the method may include storing status information in the status database, as described herein. For example, such status information may be handset location information, handset status information, and/or shared line instance status information.

In one embodiment, the method may include detecting a handset status and/or detecting a shared line instance status, such as detecting a change in such statuses, as described herein. For example, the method may include detecting a change in any status information that is stored in the status database. In one embodiment, this detection may be performed by a designated base (e.g., primary base) or by a base to which a particular handset is localized, such as a handset for which a status change is detected or a handset that is involved in or responsible for a change of status for a shared line instance.

In one embodiment, the method may include updating a status database, as described herein. For example, updating a status database may include updating any status information stored in the status database. In one example, updating a status database may include updating or synchronizing a distributed status database, such as by using replication. For example, updating a status database may include sending one or more status update messages from the base that detected a status change to the other bases, which then use updated status information in the status update messages to update distributed copies of the status database stored in each base. In one example, updating a status database may include updating a centralized status database, such as by using duplication. For example, updating a status database may include communicating a detected status change to a designated base to update a master copy of the status database stored or maintained by the designated base, and then broadcasting the master copy or sending status update messages to other bases to update their stored copies of the status database to match the updated master copy. For example, such status update messages may include information regarding the detected status change.

In one embodiment, the method may include broadcasting a status broadcast, as described herein. In one example, the status broadcast may be universally broadcast on one or more dedicated DECT channels by the base of a single-cell system or by each base of a multi-cell system. In one example, the status broadcast may include information from the status database, specifically updated status information from a detected change in status of a handset and/or a shared line or shared line instance. In one example, the status broadcast may be dynamic based on what status information was changed or detected, and the status broadcast may or may not be broadcast by a particular base depending on the configurations (e.g., BM configurations or KLE configurations) for the handsets localized to that base.

In one embodiment, the method may include receiving the status broadcast by the plurality of handsets of a single-cell or multi-cell DECT system, as described herein.

In one embodiment, the method may include indicating a detected status or change in status, updating such an indication, or using one handset to engage with another handset or a shared line or line instance. For example, the method may include indicating by a first handset (e.g., via a key or display thereof) a detected handset status of a second handset for which the first handset is registered or assigned to monitor and receive handset status information. For example, the method may include indicating by a handset (e.g., via a key or display thereof) a detected status of a shared line instance that the handset is registered or assigned to use and to monitor for status information.

In one embodiment, the method may include configuring a single-cell or multi-cell DECT system, or a handset, configuration database, or other component of the system. In one example, the method may include such a configuration to monitor and receive status information regarding certain other handsets. In one example, the method may include such a configuration to use and to monitor and receive status information regarding certain shared lines or line instances.

Although examples herein describe DECT systems and methods, the invention may encompass or relate to telecommunications systems and methods that use other types of wireless communication or other wireless protocols. For example, the multi-cell DECT systems shown in FIGS. 1-4 may use a wireless standard other than DECT protocol for transmissions or communications between first, second, and third bases 10, 20, 30 and the plurality of portable handsets 50, 52, 54, 56, 58, 60, such as for first, second, and third status broadcasts 18, 28, 38. For example, such wireless standard may be Wi-Fi or another type of LAN, Bluetooth or another type of personal area network, or a cellular network technology (e.g., 5G, LTE, CDMA, or GSM) or another type of wide area network.

In sum, the inventors have developed systems and methods for implementing BM and KLE capabilities in a telecommunications system, such as a single-cell or multi-cell DECT system, without server support. Each handset in the system has the capability to be aware of the statuses of all of the other handsets in the system, as well as the statuses of shared lines or line instances shared by the handsets.

The foregoing description, for purposes of illustration and explanation, used specific nomenclature to provide a thorough understanding of the invention. However, it will be apparent to one skilled in the art that specific details are not required in order to practice the invention. Thus, the foregoing descriptions of specific embodiments of the invention are not intended to be exhaustive or to limit the invention to the precise forms disclosed; obviously, many modifications and variations are possible in view of the above teachings. The embodiments were chosen and described in order to best explain the principles of the invention and its practical applications, and they thereby enable others skilled in the art to best utilize the invention and various embodiments with various modifications as are suited to the particular use contemplated.

The invention claimed is:

1. A telecommunications system comprising:
   a first base;
   a second base;
   a first plurality of handsets, wherein each handset of the first plurality of handsets is localized to the base;
   a second plurality of handsets, wherein each handset of the second plurality of handsets is localized to the second base; and
   a status database for storing a status information of a first handset of the first plurality of handsets,
   wherein the first base broadcasts to the first plurality of handsets a status broadcast that comprises the status information and enables a busy monitoring capability of a second handset of the first plurality of handsets to monitor the status information of the first handset, and the second base broadcasts the status broadcast to the second plurality of handsets, and
   wherein:
   the status database also stores a shared-line status of a line shared among at least two shared-line handsets; and
   the status broadcast comprises the shared-line status and enables a key line emulation capability of a shared-line handset to monitor the shared-line status of the shared line.

2. The telecommunications system of claim 1, wherein the status database is distributed among the first and second bases.

3. The telecommunications system of claim 1, wherein:
   the status information comprises a handset status of the first handset;
   the second handset comprises a busy monitoring indicator;
   the second handset receives the status broadcast; and
   the busy monitoring indicator indicates the handset status of the first handset.

4. The telecommunications system of claim 1, wherein the status information comprises an updated status of the first handset, wherein the first handset changed from a first handset status to a second handset status.

5. The telecommunications system of claim 4, wherein the updated status is detected by the first base.

6. The telecommunications system of claim 5, wherein: the first base transmits a status update message to the second base; and
the status update message comprises the updated status.

7. The telecommunications system of claim 6, wherein:
   the status database is distributed among the first and second bases; and
   a distributed copy of the status database at the second base is updated with the status update received via the status update message.

8. The telecommunications system of claim 1, wherein:
   the telecommunications system is a digital enhanced cordless telecommunications (DECT) system;
   the first base is a DECT base;
   the first plurality of handsets are DECT handsets; and
   the status broadcast is broadcast via DECT protocol.

9. The telecommunications system of claim 1, further comprising a configuration database that stores configuration information of the second handset.

10. The telecommunications system of claim 9, wherein the configuration information comprises a busy monitoring configuration.

11. A telecommunications system comprising:
    at least two bases;
    a plurality of handsets, wherein each handset is localized to one of the at least two bases; and
    a status database for storing a status information of a line shared among at least two handsets of the plurality of handsets,
    wherein the at least two bases broadcast to the plurality of handsets a status broadcast that comprises the status information.

12. The telecommunications system of claim 11, wherein the status database is distributed among the at least two bases.

13. The telecommunications system of claim 11, wherein:
    the status information comprises a shared-line status of a line shared among at least two shared-line handsets of the plurality of handsets;
    a first shared-line handset comprises a key line emulation (KLE) indicator;
    the first shared-line handset receives the status broadcast; and
    the KLE indicator indicates the status of the shared line.

14. The telecommunications system of claim 11, wherein the status information comprises an updated status of the shared line, wherein the shared line changed from a first shared-line status to a second shared-line status.

15. The telecommunications system of claim 14, wherein the updated status is detected by a first base of the at least two bases.

16. The telecommunications system of claim 15, wherein:
    the first base of the at least two bases transmits a status update message to the other base(s) of the at least two bases; and
    the status update message comprises the updated status.

17. The telecommunications system of claim 16, wherein:
    the status database is distributed among the at least two bases; and
    a distributed copy of the status database at the other base(s) of the at least two bases is updated with the status update received via the status update message.

18. The telecommunications system of claim 11, wherein:
    the telecommunications system is a digital enhanced cordless telecommunications (DECT) system;
    the least two bases are DECT bases;
    the plurality of handsets are DECT handsets; and
    the status broadcast is broadcast via DECT protocol.

19. The telecommunications system of claim 11, further comprising a configuration database that stores configuration information of a second handset.

20. The telecommunications system of claim 19, wherein the configuration information comprises a key line emulation configuration.

21. A telecommunications method comprising:
providing a telecommunications system comprising at least two bases, a plurality of handsets, wherein each handset is localized to one of the at least two bases, and a status database;
storing in the status database a first status information of one or more of a first handset and a line shared among at least two handsets;
detecting a second status information of one or more of the first handset, if the first status information was of the first handset, and the shared line, if the first status information was of the shared line;
updating the status database with the second status information; and
broadcasting a status broadcast comprising the second status information, wherein the status broadcast is broadcast to the plurality of handsets by the at least two bases.

22. The telecommunications method of claim 21, wherein the status database is distributed among the at least two bases.

23. The telecommunications method of claim 21, wherein:
the telecommunications system is a digital enhanced cordless telecommunications (DECT) system;
the at least two bases are DECT bases;
the plurality of handsets are DECT handsets; and
broadcasting the status broadcast comprises broadcasting the status broadcast via DECT protocol.

24. The telecommunications method of claim 21, wherein detecting a second status information is performed by a base of the at least two bases.

25. The telecommunications method of claim 21, further comprising indicating the second status information, wherein the second status information is indicated on a second handset, wherein the second status information is indicated by one or more of a busy monitoring indicator, if the second status information is of the first handset, and a key line emulation indicator, if the second status information is of the shared line, of the second handset.

26. The telecommunications method of claim 21, further comprising configuring a second handset to indicate the second status information.

* * * * *